April 25, 1967  F. FRITSCH  3,315,547
EPICYCLIC GEARS
Filed Sept. 28, 1964

INVENTOR.
Felix Fritsch
BY
Wood, Herron and Evans
ATTORNEYS

3,315,547
EPICYCLIC GEARS
Felix Fritsch, Vienna, Austria, assignor to Simmering-Graz-Pauker Aktiengesellschaft für Maschinen-, Kessel- und Waggonbau, Vienna, Austria
Filed Sept. 28, 1964, Ser. No. 399,760
Claims priority, application Austria, Sept. 26, 1963,
A 7,736/63
1 Claim. (Cl. 74—801)

This invention relates to epicyclic gears consisting of a sun wheel, a plurality of planet wheels grouped around and meshing with said sun wheel, a hollow wheel surrounding and meshing with the planet wheels, a planet wheel carrier, eccentric pins freely rotatably mounted in said planet wheel carrier, the planet wheels being freely rotatably mounted on said eccentric pins, each of said eccentric pins being connected to one end of a lever, and a disc for operatively coupling the free ends of the levers, the disc extending transversely to the axis of the gear and freely movable in its plane.

It is an object of the invention to facilitate the manufacture of such gears and to obtain a higher precision with the aid of simpler methods of manufacture.

It is a further object of the invention to simplify the structure of such gears.

Hence, it is a feature of the invention to provide an epicyclic gear which comprises a sun wheel, a plurality of planet wheels grouped around and meshing with said sun wheel, a hollow wheel surrounding and meshing with the planet wheels, a planet wheel carrier, eccentric pins freely rotatably mounted in said planet wheel carrier, the planet wheels being freely rotatably mounted on said eccentric pins, each of said eccentric pins being connected to one end of a lever, and a disc for operatively coupling the free ends of the levers, the disc extending transversely to the axis of the gear and freely movable in its plane, the gear including a pin parallel to the gear axis and secured to the disc and in articulated engagement with a bore in the free end of one of the levers, and pins extending parallel to the gear axis and secured to the disc and engaging longitudinal slots formed in the free ends of the levers and open at one end, the center lines of the longitudinal slots including substantially a right angle with the radius extending through the associated pin.

Another feature of the invention resides in that the pins secured to the disc engage longitudinal slots formed at the free ends of the levers and closed at both ends.

An illustrative embodiment of the invention is shown in the drawing.

Figure 1:
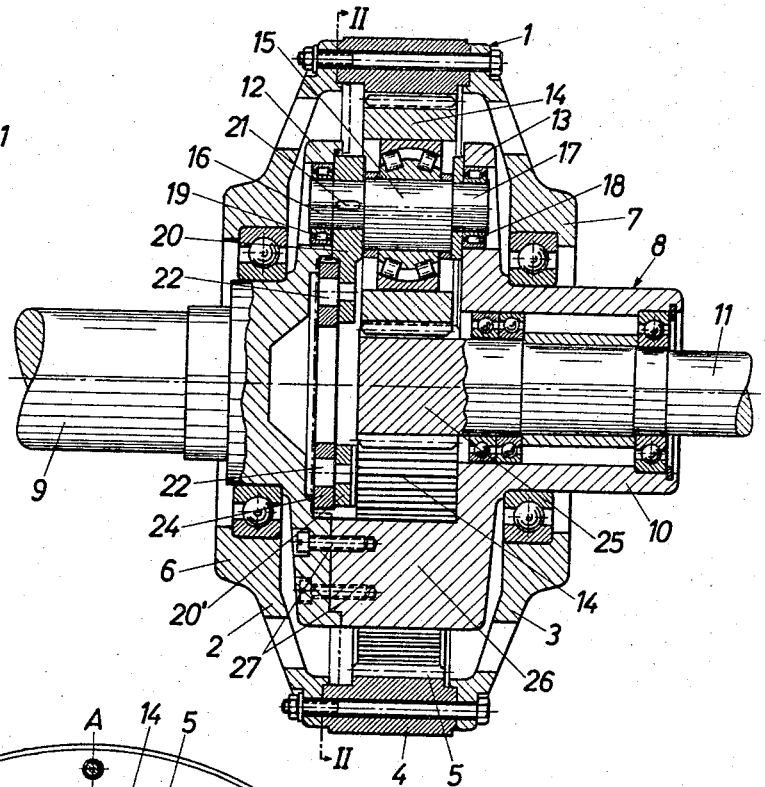
FIG. 1 is a longitudinal sectional view showing the epicyclic gear.

The epicyclic gear is accommodated in a housing 1, which consists of the two covers 2, 3 and the cylindrical intermediate part 4 rigidly connected thereto. This intermediate part 4 serves as a hollow wheel and is provided with an internal gear ring 5. A planet carrier 8 mounted in the hubs 6 and 7 of the covers 2 and 3 is connected at its output end to the output shaft 9 mounted in the hub 6 and has at its input end a hollow hub 10 mounted in the hub 7 and serving to receive the input shaft 11.

The planet carrier 8 has two spaced, opposed cheeks 12, 13, which are connected by lugs 26 and screws 27 and between which three planet wheels 14 are disposed, which are mounted in bearings spaced 120° apart and which mesh with the gear ring 5 of the hollow wheel 4 and with the sun wheel 25, which is disposed at the center of the gear and connected to the drive shaft 11.

Each of the epicyclic wheels 14 is carried by an eccentric pin 15, the eccentric end portions 16 and 17 are mounted in needle bearings 18 and 19 carried by the cheeks 12 and 13. Each of the end portions 16 has pushed thereon an eye bearing formed by one end of a lever 20 and coupled to the end portion 16 for rotation, e.g., by means of a key 21. The other end of the levers 20 is operatively connected to a disc 24 which is freely movable in its plane. Three pins 22, corresponding to the number of planet wheels, are rigidly secured in the disc 24. The planet wheels being evenly angularly spaced, the pins 22 are also evenly angularly spaced on the disc 24. In the embodiment shown, this angular spacing amounts to 120°. One of the levers 20 has a bore, which fits the associated pin 22 so that an articulated connection exists between this pin and the lever 20. The other levers 22 are provided with slots 23, which are open at the free end of the lever and extend parallel to the longitudinal direction of the levers. The width of these slots corresponds to the thickness of the pins 22 so that the latter can move in the slots only in the longitudinal direction of the latter.

The pins 22 engaging the slots may be replaced by rollers, slide blocks or the like elements.

Figure 2:
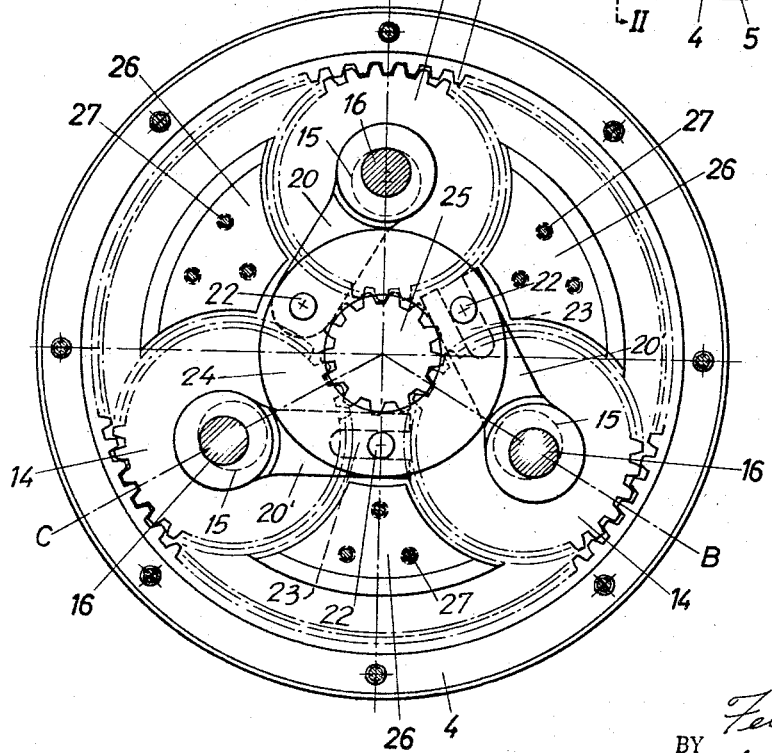
FIG. 2 is a transverse sectional view taken on line II—II of FIG. 1.

When the disc 24 is in its central position, the axis of each planet wheel 14, the axis of the pin 15 carrying the same, the axis of its eccentrically mounted end portions 16, 17 and the axis of the sun wheel 25 and of the gear as a whole lie in the same plane. Those planes of said axes which belong to the planet wheels 14 are indicated with dash and dot lines in FIG. 2 and designated A, B and C.

The levers 20 are so arranged relative to the eccentric pins 15 that the pins 22 secured to the disc 24 act perpendicular on the walls of the slots 23.

The disc 24 is freely movable in its plane and is only suspended from the three pins 22. As it is balanced only by the three forces radially transmitted by the levers 20 in directions spaced 120° apart, these three forces must be approximately equal in magnitude. Since the lengths of the levers and the eccentricities of the pins 22 are also equal to each other, the loads on the shafts of the three planet wheels must also be equal in magnitude. This affords a solution to the problem how to achieve a uniform load distribution on all planet wheels.

The described gear operates as follows: The rotation coming from the input shaft 11 is transmitted to the planet wheels 14 by the sun wheel 25. The planet wheels 14 mesh with and revolve along the gear ring 5 of the stationary housing 1 and transmit their rotation by means of the eccentric pins 15 and their end portions 16, 17 to the planet carrier 8, which drives the output shaft 9. It is obvious that motion can also be transmitted in the other sense, from shaft 9 to shaft 11.

If manufacturing inaccuracies result in differences between the angles between the bearings for the eccentric pins or between the points where the pins engage the lever ends in the slots of the disc, this will necessarily result in differences in the distribution of the load to the three planet wheels. However, these differences are so small that they are practically insignificant.

In a modification of the embodiment which has been shown, the slots in the free ends of the levers may be replaced by closed elongated holes. Whereas the manufacture of this embodiment may be more difficult than the formation of open slots, it affords the advantage that the levers are stronger or may be made from a thinner material than is required in the case of open slots. This embodiment comprising levers formed with closed slots is particularly suitable for gears to be assembled within a small space.

Whereas three planet wheels are provided in the illustrative embodiment shown, the design according to the invention can also be applied to arrangements comprising four or more planet wheels.

I claim:

An epicyclic gear, comprising a sun wheel, a plurality of planet wheels grouped around and meshing with said sun wheel, a hollow wheel surrounding and meshing with the planet wheels, a planet wheel carrier, eccentric pins freely rotatably mounted in said planet wheel carrier, the planet wheels being freely rotatably mounted on said eccentric pins, each of said eccentric pins being connected to one end of a lever, and a disc for operatively coupling the free ends of the levers, the disc extending transversely to the axis of the gear and freely movable in its plane, the gear including a first pin parallel to the gear axis and pivotally interconnecting the disc and the free end of one of the levers, said pivotal connection being operative to permit relative rotational movement between said disc and said one lever but being operative to preclude relative lineal movement therebetween, and other pins extending parallel to the gear axis and secured to the disc and engaging longitudinal slots formed in the free ends of the other levers, the center lines of the longitudinal slots being at substantially a right angle with the radius extending through the associated pin.

References Cited by the Examiner

UNITED STATES PATENTS

| 2,166,909 | 7/1939 | Kahn | 74—580 |
| 3,080,775 | 3/1963 | Fritsch | 74—801 |

FOREIGN PATENTS

| 494,658 | 6/1919 | France. |
| 701,492 | 3/1931 | France. |

DAVID J. WILLIAMOWSKY, *Primary Examiner.*

J. R. BENEFIEL, *Assistant Examiner.*